(12) United States Patent
Kodemura et al.

(10) Patent No.: US 11,466,129 B2
(45) Date of Patent: Oct. 11, 2022

(54) METHOD FOR MANUFACTURING SYNTHETIC RUBBER LATEX

(71) Applicant: ZEON CORPORATION, Tokyo (JP)

(72) Inventors: Junji Kodemura, Tokyo (JP); Yoshitaka Satoh, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 446 days.

(21) Appl. No.: 16/486,347

(22) PCT Filed: Feb. 9, 2018

(86) PCT No.: PCT/JP2018/004679
§ 371 (c)(1),
(2) Date: Aug. 15, 2019

(87) PCT Pub. No.: WO2018/159270
PCT Pub. Date: Sep. 7, 2018

(65) Prior Publication Data
US 2019/0367687 A1  Dec. 5, 2019

(30) Foreign Application Priority Data
Feb. 28, 2017 (JP) ............................. JP2017-036981

(51) Int. Cl.
*C08J 3/09* (2006.01)
*B01F 23/80* (2022.01)
*B01F 23/41* (2022.01)
*C08J 3/07* (2006.01)
*B01F 23/40* (2022.01)

(52) U.S. Cl.
CPC ............ *C08J 3/09* (2013.01); *B01F 23/4105* (2022.01); *B01F 23/806* (2022.01); *C08J 3/07* (2013.01); *B01F 23/483* (2022.01); *C08J 2309/00* (2013.01)

(58) Field of Classification Search
CPC .. C08J 3/07; C08J 3/09; C08J 2309/00; B01F 23/483; B01F 23/4105; B01F 23/806
See application file for complete search history.

(56) References Cited

U.S. PATENT DOCUMENTS 8,648,131 B2 * 2/2014 van der Waal ........... C08C 1/12
523/340
2011/0112217 A1 5/2011 van der Waal et al.

FOREIGN PATENT DOCUMENTS

| CN | 102702395 A | 10/2012 |
|---|---|---|
| JP | 5260738 B2 | 8/2013 |

OTHER PUBLICATIONS

Sep. 3, 2019 International Preliminary Report on Patentability issued in International Patent Application No. PCT/JP2018/004679.
Apr. 3, 2018 Search Report issued in International Patent Application No. PCT/JP2018/004679.
Jul. 19, 2022 Office Action issued in Brazil Application No. BR112019017020.

* cited by examiner

*Primary Examiner* — Patrick D Niland
(74) *Attorney, Agent, or Firm* — Oliff PLC

(57) ABSTRACT

A method for producing a synthetic rubber, the method including: an emulsification step of continuously feeding a solution or a dispersion of a synthetic rubber obtained by dissolving or dispersing the synthetic rubber in an organic solvent and an aqueous solution of an emulsifier to a mixer and mixing to continuously obtain an emulsion; a first removal step of removing the organic solvent from the emulsion continuously obtained in the emulsification step in a container while the emulsion is continuously transferred to the container regulated to a pressure condition of 700 to 760 mmHg; and a second removal step of removing the organic solvent from the emulsion that has undergone the first removal step under a pressure of less than 700 mmHg.

15 Claims, 1 Drawing Sheet

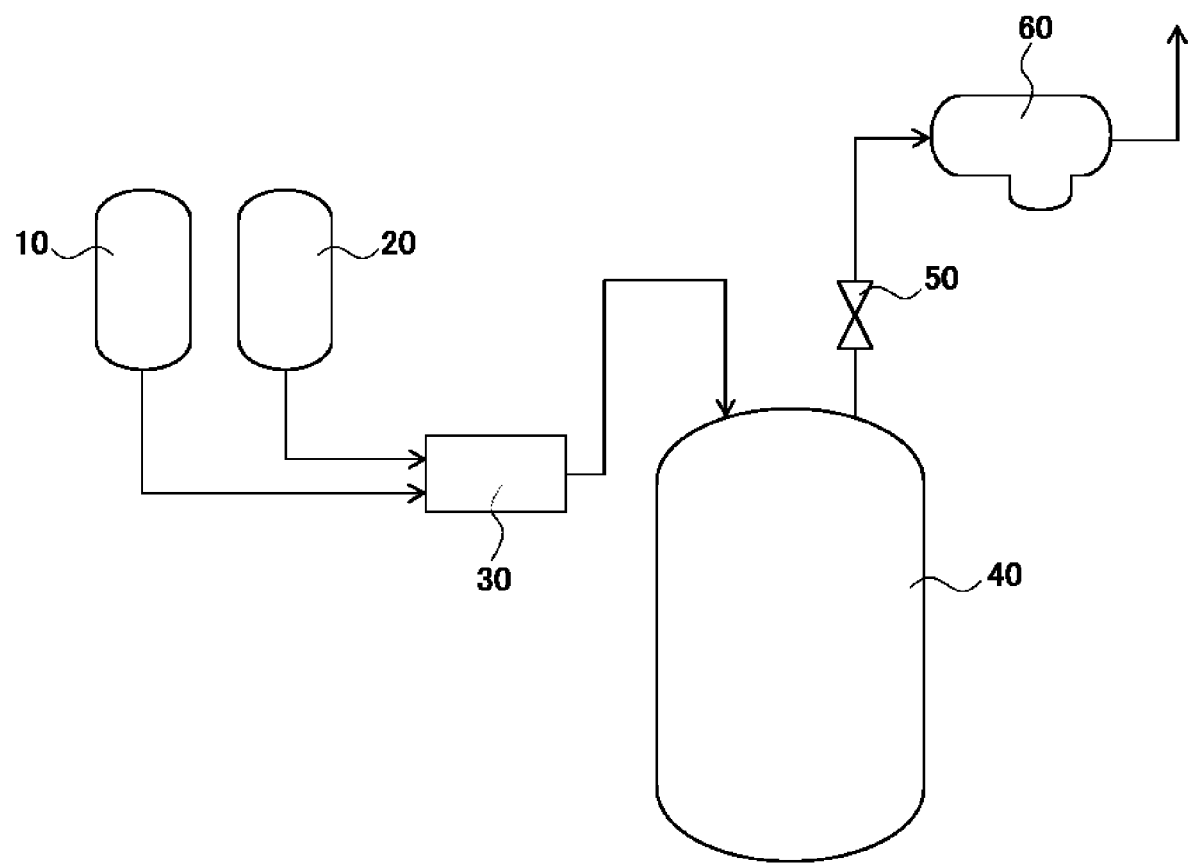

METHOD FOR MANUFACTURING SYNTHETIC RUBBER LATEX

TECHNICAL FIELD

The present invention relates to a method for producing a latex of synthetic rubber, and more specifically a method for producing a latex of synthetic rubber, the method being capable of producing a latex of synthetic rubber in a short period of time while suppressing aggregate production.

BACKGROUND ART

To date, it is known that dip molding of a latex composition containing a latex of natural rubber provides dip-molded articles that are used by being in contact with a human body, such as teats, air balls, gloves, balloons, and sacks. However, the latex of natural rubber contains protein that causes allergic symptoms in a human body and therefore may be problematic as a dip-molded article that is brought into direct contact with a mucous membrane of a living body or with an organ. Accordingly, research is in progress on the use of not a latex of natural rubber but a latex of synthetic rubber.

For example, Patent Document 1 discloses a method for producing such a latex of synthetic rubber, comprising mixing a solution of synthetic rubber obtained by dissolving synthetic rubber in an organic solvent with an aqueous solution of an emulsifier to obtain an emulsion and heating the obtained emulsion under reduced pressure at a temperature higher than the boiling point of the organic solvent to remove the organic solvent. However, the technology of Patent Document 1 is problematic in that it takes a long period of time to remove the organic solvent and results in poor productivity and problematic in that the obtained latex of synthetic rubber has a large amount of aggregates.

RELATED ART

Patent Documents

Patent Document 1: Japanese Patent No. 5260738

SUMMARY OF THE INVENTION

Problem to be Solved by the Invention

An object of the present invention is to provide a method for producing a latex of a synthetic rubber, the method being capable of producing the latex of the synthetic rubber in a short period of time while suppressing aggregate production.

Means for Solving the Problem

As a result of having conducted diligent research to solve the above problem, the inventors found that the above object can be achieved by a method wherein a solution or a dispersion of a synthetic rubber obtained by dissolving or dispersing the synthetic rubber in an organic solvent and an aqueous solution of an emulsifier are continuously fed to a mixer and mixed, and while the emulsion continuously obtained is continuously transferred to a container regulated to a pressure condition of 700 to 760 mmHg, the organic solvent is removed in the container, and then the organic solvent is removed under reduced pressure, and thus the inventors accomplished the present invention.

That is, the present invention provides a method for producing a latex of a synthetic rubber, the method comprising:

an emulsification step of continuously feeding a solution or a dispersion of a synthetic rubber obtained by dissolving or dispersing the synthetic rubber in an organic solvent and an aqueous solution of an emulsifier to a mixer and mixing to continuously obtain an emulsion;

a first removal step of removing the organic solvent from the emulsion continuously obtained in the emulsification step in a container while the emulsion is continuously transferred to the container regulated to a pressure condition of 700 to 760 mmHg; and a second removal step of removing the organic solvent from the emulsion that has undergone the first removal step under a pressure of less than 700 mmHg.

In the method for producing a latex of a synthetic rubber according to the present invention, in the first removal step, the organic solvent is preferably removed while controlling the temperature of the emulsion to a temperature lower than the boiling point of the organic solvent.

In the method for producing a latex of a synthetic rubber according to the present invention, in the first removal step, the organic solvent is preferably removed while controlling the temperature of the emulsion to a temperature at least 10° C. lower than the boiling point of the organic solvent contained in the emulsion.

In the method for producing a latex of a synthetic rubber according to the present invention, in the second removal step, the organic solvent is preferably removed while controlling the temperature of the emulsion to a temperature higher than or equal to the boiling point of the organic solvent.

In the method for producing a latex of a synthetic rubber according to the present invention, in the second removal step, the organic solvent is preferably removed under a pressure of 1 to 600 mmHg.

In the method for producing a latex of a synthetic rubber according to the present invention, the rate of transferring the emulsion to the container (1/hr) as determined by dividing the rate of feeding the emulsion to the container ($m^3$/hr) by the volume of the container ($m^3$) is preferably 0.01 to 0.5.

Moreover, in the method for producing a latex of a synthetic rubber according to the present invention, the removal of the organic solvent under a pressure of 700 to 760 mmHg by the first removal step is continued until the amount of the emulsion fed to the container is preferably 70 to 140% by volume based on the volume of the container, and then the pressure inside the container is set to less than 700 mmHg to perform the removal of the organic solvent by the second removal step.

Effects of Invention

According to the method for producing a latex of a synthetic rubber of the present invention, a latex of a synthetic rubber can be produced in a short period of time while suppressing aggregate production, thereby enabling productivity improvement.

BRIEF DESCRIPTION OF DRAWINGS

FIG. 1 is a diagram showing an example of an emulsifying apparatus used in the method for producing a latex of a synthetic rubber of the present invention.

DESCRIPTION OF EMBODIMENTS

The method for producing a latex of a synthetic rubber of the present invention comprises:

an emulsification step of continuously feeding a solution or a dispersion of a synthetic rubber obtained by dissolving or dispersing the synthetic rubber in an organic solvent and an aqueous solution of an emulsifier to a mixer and mixing to continuously obtain an emulsion;

a first removal step of removing the organic solvent from the emulsion continuously obtained in the emulsification step in a container while the emulsion is continuously transferred to the container regulated to a pressure condition of 700 to 760 mmHg; and a second removal step of removing the organic solvent from the emulsion that has undergone the first removal step under a pressure of less than 700 mmHg.

Emulsification Step

The emulsification step of the production method of the present invention is a step wherein a solution or dispersion of a synthetic rubber obtained by dissolving or dispersing synthetic rubber in an organic solvent and an aqueous solution of an emulsifier are continuously fed to a mixer and mixed to continuously obtain an emulsion.

The solution or dispersion of a synthetic rubber used in the production method of the present invention is not particularly limited as long as it is a solution or dispersion obtained by dissolving or dispersing a synthetic rubber in an organic solvent.

Examples of the synthetic rubber include, but are not particularly limited to, a homopolymer or a copolymer of a conjugated diene monomer, such as a synthetic polybutadiene, a synthetic polyisoprene, and a synthetic polychloroprene; a copolymer of a conjugated diene monomer and an other monomer copolymerizable therewith, such as a styrene-butadiene copolymer, a styrene-isoprene copolymer, a styrene-isoprene-styrene block copolymer, an acrylonitrile-butadiene copolymer, an acrylonitrile-isoprene copolymer, an acrylonitrile-butadiene-isoprene copolymer, and a butyl acrylate-butadiene copolymer; an acrylate (co)polymer; and the like. Among these, a synthetic polyisoprene and/or a styrene-isoprene-styrene block copolymer is preferable because a molded film such as a dip-molded article formed therefrom has excellent tensile strength and elongation.

Below, an example is provided wherein the synthetic rubber constituting a solution or dispersion of a synthetic rubber used in the production method of the present invention is a synthetic polyisoprene and/or a styrene-isoprene-styrene block copolymer, but the solution or dispersion of a synthetic rubber used in the production method of the present invention is not limited to the solution or dispersion of a synthetic polyisoprene and/or a styrene-isoprene-styrene block copolymer at all.

The synthetic polyisoprene may be a homopolymer of isoprene, or may be a copolymer of isoprene and another ethylenically unsaturated monomer that is copolymerizable with isoprene. Since a molded film such as a dip-molded article that is flexible and has excellent tensile strength is likely obtained, the content of an isoprene unit in synthetic polyisoprene is preferably 70% by weight or more, more preferably 90% by weight or more, even more preferably 95% by weight or more, and particularly preferably 100% by weight (a homopolymer of isoprene) based on all monomer units.

Examples of another ethylenically unsaturated monomer that is copolymerizable with isoprene include conjugated diene monomers other than isoprene, such as butadiene, chloroprene, and 1,3-pentadiene; ethylenically unsaturated nitrile monomers such as acrylonitrile, methacrylonitrile, fumaronitrile, and α-chloroacrylonitrile; vinyl aromatic monomers such as styrene and alkylstyrene; ethylenically unsaturated carboxylic acid ester monomers such as methyl (meth)acrylate (which means "methyl acrylate and/or methyl methacrylate", and the same applies to ethyl (meth)acrylate and the like), ethyl (meth)acrylate, butyl (meth)acrylate, and 2-ethylhexyl (meth)acrylate; and the like. One of these other ethylenically unsaturated monomers that are copolymerizable with isoprene may be used singly, or two or more may be used in combination.

Synthetic polyisoprene can be obtained, by a method known to date, as a solution of synthetic polyisoprene in which synthetic polyisoprene is dissolved in an organic solvent by, for example, subjecting isoprene and optionally used copolymerizable another ethylenically unsaturated monomer to solution polymerization in an organic solvent using a Ziegler polymerization catalyst consisting of trialkylaluminum-titanium tetrachloride or an alkyllithium polymerization catalyst such as n-butyllithium or sec-butyllithium. The solution of synthetic polyisoprene obtained by solution polymerization may be used as-is in the emulsification step, or solid synthetic polyisoprene may be separated from the solution obtained by solution polymerization and then used after being dissolved in an organic solvent.

Examples of the organic solvent used in polymerization include aromatic hydrocarbon solvents such as benzene, toluene, and xylene; alicyclic hydrocarbon solvents such as cyclopentane, cyclopentene, cyclohexane, and cyclohexene; aliphatic hydrocarbon solvents such as butane, pentane, hexane, and heptane; halogenated hydrocarbon solvents such as methylene chloride, chloroform, and ethylene dichloride; and the like. Among these, aliphatic hydrocarbon solvents are preferable, and butane is particularly preferable.

There are four types of isoprene unit in synthetic polyisoprene, i.e., a cis bonding unit, a trans bonding unit, a 1,2-vinyl bonding unit, and a 3,4-vinyl bonding unit according to the bonding state of isoprene. From the viewpoint of increasing the tensile strength of the obtained molded film such as a dip-molded article, the proportion of the cis bonding unit in isoprene units contained in synthetic polyisoprene is preferably 70% by weight or more, more preferably 90% by weight or more, and even more preferably 95% by weight or more based on all isoprene units.

The weight average molecular weight of synthetic polyisoprene is preferably 10,000 to 5,000,000, more preferably 500,000 to 5,000,000, and even more preferably 800,000 to 3,000,000 in terms of standard polystyrene by gel permeation chromatography analysis. By configuring the weight average molecular weight of synthetic polyisoprene to be in the above range, the tensile strength of the obtained molded film is increased when synthetic polyisoprene is formed into a molded film such as a dip-molded article, and also a synthetic polyisoprene latex tends to be easily produced.

The polymer Mooney viscosity ($ML_{1+4}$, 100° C.) of synthetic isoprene is preferably 50 to 80, more preferably 60 to 80, and even more preferably 70 to 80.

The styrene-isoprene-styrene block copolymer is a block copolymer of styrene and isoprene. The proportions of the styrene unit and the isoprene unit contained in the styrene-isoprene-styrene block copolymer are not particularly limited and, in terms of the weight ratio of "styrene unit: isoprene unit", are usually 1:99 to 90:10, preferably 3:97 to 70:30, more preferably 5:95 to 50:50, and even more preferably 10:90 to 30:70.

The styrene-isoprene-styrene block copolymer can be obtained, by a method known to date, as a solution of the styrene-isoprene-styrene block copolymer in which the styrene-isoprene-styrene block copolymer is dissolved in an organic solvent by, for example, subjecting isoprene and styrene to block copolymerization in an organic solvent using a Ziegler polymerization catalyst consisting of trialkylaluminum-titanium tetrachloride or an alkyllithium polymerization catalyst such as n-butyllithium or sec-butyllithium. The solution of the styrene-isoprene-styrene block copolymer obtained by block copolymerization may be used as-is in the emulsification step, or a solid styrene-isoprene-styrene block copolymer may be separated from the solution obtained by block copolymerization and then used after being dissolved in an organic solvent. Examples of the organic solvent for use in polymerization include the same solvents as those described in relation to the above synthetic isoprene.

From the viewpoint of increasing the tensile strength of the obtained molded film such as a dip-molded article, the proportion of the cis bonding unit in isoprene units contained in the styrene-isoprene-styrene block copolymer is preferably 90% by weight or more, more preferably 95% by weight or more, and even more preferably 98% by weight or more based on all isoprene units.

The weight average molecular weight of the styrene-isoprene-styrene block copolymer is preferably 10,000 to 1,000,000, more preferably 50,000 to 500,000, and even more preferably 100,000 to 300,000 in terms of standard polystyrene by gel permeation chromatography analysis. By configuring the weight average molecular weight of the styrene-isoprene-styrene block copolymer to be in the above range, the tensile strength of the obtained molded film is increased when the styrene-isoprene-styrene block copolymer is formed into a molded film such as a dip-molded article, and also a styrene-isoprene-styrene block copolymer latex tends to be easily produced.

The polymer Mooney viscosity ($ML_{1+4}$, 100° C.) of the styrene-isoprene-styrene block copolymer is preferably 50 to 80, more preferably 60 to 80, and even more preferably 70 to 80.

The proportion of synthetic rubber in a solution or dispersion of synthetic rubber used in the emulsification step of the production method of the present invention is not particularly limited, and is preferably 3 to 30% by weight, more preferably 5 to 20% by weight, and more preferably 7 to 15% by weight.

The emulsifier constituting the aqueous solution of an emulsifier used in the emulsification step of the production method of the present invention is not particularly limited, and an anionic emulsifier can be preferably used. Examples of the anionic emulsifier include fatty acid salts such as sodium laurate, potassium myristate, sodium palmitate, potassium oleate, sodium linolenate, sodium rosinate, and potassium rosinate; alkylbenzenesulfonic acid salts such as sodium dodecylbenzenesulfonate, potassium dodecylbenzenesulfonate, sodium decylbenzenesulfonate, potassium decylbenzenesulfonate, sodium cetylbenzenesulfonate, and potassium cetylbenzenesulfonate; alkyl sulfosuccinic acid salts such as sodium di(2-ethylhexyl)sulfosuccinate, potassium di(2-ethylhexyl) sulfosuccinate, and sodium dioctyl sulfosuccinate; alkyl sulfuric acid ester salts such as sodium lauryl sulfate and potassium lauryl sulfate; polyoxyethylene alkyl ether sulfuric acid ester salts such as sodium polyoxyethylene lauryl ether sulfate and potassium polyoxyethylene lauryl ether sulfate; monoalkyl phosphoric acid salts such as sodium lauryl phosphate and potassium lauryl phosphate; and the like.

Among these anionic emulsifiers, fatty acid salts, alkylbenzenesulfonic acid salts, alkyl sulfosuccinic acid salts, alkyl sulfuric acid ester salts, and polyoxyethylene alkyl ether sulfuric acid ester salts are preferable, fatty acid salts and alkylbenzene sulfonic acid salts are more preferred, fatty acid salts are even more preferable, and, from the viewpoint that aggregate production in the obtained latex of synthetic rubber can be more suitably prevented, sodium rosinate and potassium rosinate are particularly preferable.

The proportion of the emulsifier in the aqueous solution of an emulsifier used in the emulsification step of the production method of the present invention is not particularly limited, and is preferably 0.1 to 5% by weight, more preferably 0.3 to 3% by weight, and more preferably 0.5 to 2% by weight.

In the emulsification step of the production method of the present invention, such a solution or dispersion of synthetic rubber obtained by dissolving or dispersing synthetic rubber in an organic solvent and such an aqueous solution of an emulsifier are continuously fed to a mixer and mixed to thereby continuously obtain an emulsion.

Meanwhile, FIG. 1 is a diagram showing an example of an emulsifying apparatus used in the method for producing a latex of synthetic rubber of the present invention. As shown in FIG. 1, the emulsifying apparatus shown in FIG. 1 includes a polymer tank 10, an emulsifier tank 20, a mixer 30, a storage tank 40, a valve 50, and a concentrator 60.

Below, the emulsification step of the production method of the present invention is described with reference to FIG. 1, but the present invention is not particularly limited to the embodiment involving the emulsifying apparatus shown in FIG. 1.

That is, when described in reference to FIG. 1, in the emulsification step of the production method of the present invention, a solution or dispersion of synthetic rubber from the polymer tank 10 and an aqueous solution of an emulsifier from the emulsifier tank 20 are both continuously fed to the mixer 30, accordingly the solution or dispersion of synthetic rubber and the aqueous solution of an emulsifier are continuously mixed in the mixer 30 to thus continuously obtain an emulsion. Then, in the production method of the present invention, the obtained emulsion is continuously supplied to the storage tank 40.

In the emulsification step of the production method of the present invention, the proportions of the solution or dispersion of synthetic rubber and the aqueous solution of an emulsifier when continuously feeding them to the mixer 30 are not particularly limited, and, in terms of the volume ratio of "the solution or dispersion of synthetic rubber:the aqueous solution of an emulsifier" are preferably 1:2 to 1:0.3, more preferably 1:1.5 to 1:0.5, and even more preferably 1:1 to 1:0.7, from the viewpoint of enabling emulsification of synthetic rubber to proceed more appropriately.

The mixer 30 is not particularly limited as long as it is an apparatus capable of continuously performing mixing and, for example, a trade name "TK Pipeline Homomixer" (manufactured by Tokushu Kika Kogyo Co., Ltd.), a trade name "Colloid Mill" (manufactured by Kobelco Pantech), a trade name "Thrasher" (manufactured by Nippon Coke & Engineering Co., Ltd.), a trade name "Trigonal Wet Micropulverizer" (manufactured by Mitsui Miike Engineering Corp.,), a trade name "Cavitron" (manufactured by Eurotech), a trade name "Milder" (manufactured by Pacific Machinery & Engineering Co., Ltd.), and a trade name "Fine Flow Mill" (manufactured by Pacific Machinery & Engineering Co., Ltd.) can be used. The conditions of the mixing operation by the mixer 30 are not particularly limited, and the treatment temperature, treatment time, and the like may be suitably selected so as to attain the desired dispersion state.

In the emulsification step of the production method of the present invention, the temperatures of the solution or dispersion of synthetic rubber and the aqueous solution of an emulsifier when the solution or dispersion of synthetic rubber and the aqueous solution of an emulsifier are continuously fed to the mixer 30 and mixed are not particularly limited, and are preferably 20 to 100° C., more preferably 40 to 90° C., and even more preferably 60 to 80° C. from the viewpoint of making it possible to favorably perform emulsification. The temperature when mixing these components may be controlled by regulating the temperature at which the solution or dispersion of synthetic rubber is stored in the polymer tank 10 and the temperature at which the aqueous solution of an emulsifier is stored in the emulsifier tank 20 such that the mixing temperature becomes the desired temperature. For example, when mixing the solution or dispersion of synthetic rubber at 60° C. with the aqueous solution of an emulsifier at 60° C. by the mixer 30, the temperature at which the solution or dispersion of synthetic rubber is stored in the polymer tank 10 is set to 60° C., and the temperature at which the aqueous solution of an emulsifier is stored in the emulsifier tank 20 may be set to 60° C.

First Removal Step

The first removal step of the production method of the present invention is a step wherein while the emulsion continuously obtained in the emulsification step is continuously transferred to a container regulated to a pressure condition of 700 to 760 mmHg, the organic solvent contained in the emulsion (i.e., the organic solvent derived from the solution or dispersion of synthetic rubber) is removed in the container. Removal of the organic solvent from the emulsion in the first removal step of the production method of the present invention is usually performed substantially simultaneously with the emulsification step because the first removal step is performed while the emulsion continuously obtained in the emulsification step is continuously transferred to the container.

Below, a specific embodiment of the first removal step of the production of method the present invention is described with reference to FIG. 1, but the present invention is not particularly limited to the embodiment employing the emulsifying apparatus shown in FIG. 1.

That is, in a specific embodiment of the first removal step of the production method of the present invention when described in reference to FIG. 1, in the first removal step, the pressure in the storage tank 40 is controlled to 700 to 760 mmHg while the emulsion continuously fed from the mixer 30 is continuously received by the storage tank 40, and thereby the organic solvent contained in the received emulsion is removed under normal pressure. Here, the first removal step of the production method of the present invention can be embodied such that the valve 50 is set to "open" to remove the organic solvent under normal pressure, accordingly the inside of the storage tank 40 becomes an open system, and thus the organic solvent removed from the emulsion under normal pressure is recovered by the concentrator 60 through the pipe on the valve 50 side. Alternatively, the first removal step of the production method of the present invention may be embodied such that a pressure reducing pump is connected to the downstream side of the concentrator 60, the valve 50 is set to an "open" state such that the pressure inside the storage tank 40 is maintained at 700 mmHg or more and less than 760 mmHg by the pressure reducing pump, and in this state, the organic solvent removed from the emulsion under normal pressure is recovered by the concentrator 60 in a similar manner.

The pressure in the first removal step is 700 to 760 mmHg, preferably 730 to 760 mmHg, and particularly preferably atmospheric pressure (760 mmHg) from the viewpoint of easily controlling the pressure.

In the first removal step of the production method of the present invention, the temperature of the emulsion in the storage tank 40 when removing the organic solvent contained in the emulsion under normal pressure is preferably controlled to a temperature lower than the boiling point of the organic solvent (i.e., the organic solvent derived from the solution or dispersion of synthetic rubber) contained in the emulsion, more preferably controlled to a temperature at least 10° C. lower than the boiling point of the organic solvent contained in the emulsion (i.e., (X-10°) C or lower is preferable when the boiling point of the organic solvent is X° C.), and even more preferably controlled to a temperature at least 20° C. lower than the boiling point of the organic solvent contained in the emulsion. The lower limit of the temperature of the emulsion in the first removal step is not particularly limited, and is preferably 30° C. or higher. Performing the removal of the organic solvent in the first removal step at such a temperature can further increase the efficiency of removing the organic solvent while effectively preventing the problem in that the emulsion foams, thus some of the emulsion enters the concentrator 60 from the storage tank 40, and the yield is impaired.

In the first removal step of the production method of the present invention, the rate of transferring the emulsion to the storage tank 40 (the receiving rate) (1/hr) determined by dividing the rate of feeding the emulsion from the mixer 30 to the storage tank 40 ($m^3$/hr) by the volume of the storage tank 40 ($m^3$), i.e., "the rate of transferring the emulsion to the storage tank 40 (1/hr)=the rate of feeding the emulsion from the mixer 30 to the storage tank 40 ($m^3$/hr)/the volume of the storage tank 40 ($m^3$)" is preferably 0.01 to 0.5, more preferably 0.05 to 0.3, and even more preferably 0.1 to 0.15. By configuring the rate of transferring the emulsion to the storage tank 40 to be in the above range, normal-pressure removal of the organic solvent in the first removal step can be sufficiently performed while achieving good productivity. As is clear from the above definition, for example, when the rate of transferring the emulsion to the storage tank 40 is 0.1 (1/hr), the amount of the emulsion transferred to the storage tank 40 reaches the volume of the storage tank 40 in 10 hours, and when the rate of transferring the emulsion to the storage tank 40 is 0.2 (1/hr), the amount of the emulsion transferred to the storage tank 40 reaches the volume of the storage tank 40 in 5 hours.

The method for configuring the rate of transferring the emulsion to the storage tank 40 to be in the above range is not particularly limited, and examples include a method involving regulating the rate of feeding the solution or dispersion of synthetic rubber from the polymer tank 10 and the aqueous solution of an emulsifier from the emulsifier tank 20 when continuously feeding them to the mixer 30, a method involving regulating the size of the storage tank 40 used, and the like.

In the first removal step of the production method of the present invention, the operation of removing the organic solvent contained in the received emulsion under normal pressure in the storage tank 40 while continuously receiving the emulsion continuously fed from the mixer 30 by the storage tank 40 is preferably continued until the amount of the emulsion fed to the storage tank 40 is 70 to 140% by volume, more preferably continued until the amount is 80 to 130% by volume, and even more preferably continued until the amount is 90 to 120% by volume based on the volume of the storage tank 40. Continuing the operation until the amount of the emulsion fed to the storage tank 40 reaches the above amount can increase the amount of the emulsion processed in one operation while effectively preventing the problem in that the emulsion foams, thus some of the emulsion enters the concentrator 60 from the storage tank 40, and the yield is impaired, and, accordingly, productivity can be increased.

In the first removal step of the production method of the present invention, the organic solvent contained in the received emulsion is evaporated in the storage tank 40 while continuously receiving the emulsion continuously fed from the mixer 30 by the storage tank 40, and thus after the end of the first removal step, the amount of the emulsion actually stored in the storage tank 40 is usually smaller than the amount of the emulsion fed from the mixer 30. That is, for example, even when the amount of the emulsion fed from the mixer 30 is 90% by volume based on the volume of the storage tank 40, the amount of the emulsion actually stored in the storage tank 40 is usually less than 90% by volume (e.g., about 80% by volume or less) of the volume of the storage tank 40 because the organic solvent contained in the emulsion is partially evaporated while the emulsion is continuously fed from the mixer 30. Accordingly, even when the amount of the emulsion fed from the mixer 30 exceeds 100% by volume based on the volume of the storage tank 40 (e.g., 120% by volume), the amount of the emulsion actually stored in the storage tank 40 can be less than 100% by volume based on the volume of the storage tank 40 because the organic solvent contained in the emulsion is partially removed under normal pressure while the emulsion is continuously fed from the mixer 30.

The first removal step of the production method of the present invention is performed such that the amount of the emulsion fed to the storage tank 40 is in the above range. The amount of the emulsion stored in the storage tank 40 after the end of the first removal step (i.e., the amount in the storage tank 40 after some of the organic solvent contained in the emulsion is removed under normal pressure) is preferably 10 to 90% by volume, more preferably 20 to 80% by volume, and most preferably 30 to 70% by volume based on the volume of the storage tank 40. The first removal step of the production method of the present invention is preferably embodied such that 50% by weight or more of the total amount of the organic solvent contained in the emulsion fed to the storage tank 40 is removed under normal pressure, more preferably embodied such that 70% by weight or more is removed under normal pressure, and particularly preferably embodied such that 80% by weight or more is removed under normal pressure. The upper limit is not particularly limited, and is about 98% by weight or less.

Second Removal Step

The second removal step of the production method of the present invention is the step of removing the organic solvent from the emulsion that has undergone the first removal step, under a pressure of less than 700 mmHg. Below, a specific embodiment of the second removal step of the production method of the present invention is described with reference to FIG. 1, but the present invention is not particularly limited to the embodiment employing the emulsifying apparatus shown in FIG. 1 is used.

That is, in a specific embodiment of the second removal step of the production method of the present invention when described in reference to FIG. 1, in the second removal step, the pressure inside the storage tank 40 is reduced to less than 700 mmHg while the emulsion that has undergone the first removal step is stored in the storage tank 40, and thus the organic solvent contained in the emulsion that has undergone the first removal step is removed under reduced pressure. The second removal step of the production method of the present invention can be embodied such that a pressure reducing pump is connected to the downstream side of the concentrator 60, and with the valve 50 being set to an open state, the pressure inside the storage tank 40 is reduced by the pressure reducing pump to less than 700 mmHg, and thus the organic solvent removed from the emulsion under reduced pressure is recovered by the concentrator 60 through the pipe located on the valve 50 side.

The pressure in the second removal step is less than 700 mmHg, preferably 1 to 600 mmHg, more preferably 10 to 500 mmHg, and most preferably 100 to 400 mmHg. By configuring the pressure inside the container to be in the above range, it is possible to suppress or prevent the removal of the organic solvent from taking a long period of time when the pressure is excessively high or the emulsifier from foaming and entering the condenser 60 or the like when the pressure is excessively low.

In the second removal step of the production method of the present invention, the temperature of the emulsion in the storage tank 40 when removing the organic solvent contained in the emulsion under reduced pressure is preferably controlled to a temperature higher than the boiling point of the organic solvent (i.e., the organic solvent derived from the solution or dispersion of synthetic rubber) contained in the emulsion, more preferably controlled to a temperature at least 5° C. higher than the boiling point of the organic solvent contained in the emulsion (i.e., (X+5°) C or higher is preferable when the boiling point of the organic solvent is X° C.), and even more preferably controlled to a temperature at least 10° C. higher than the boiling point of the organic solvent contained in the emulsion. The upper limit of the temperature of the emulsion in the second removal step is not particularly limited, and is preferably less than 100° C.

As described above, in the first removal step of the production method of the present invention, the organic solvent contained in the received emulsion is removed under normal pressure in the storage tank 40 while continuously receiving the emulsion continuously fed from the mixer 30 by the storage tank 40, and thus the amount of the emulsion actually stored in the storage tank 40 is usually smaller than the amount of the emulsion fed from the mixer 30. For example, even when the amount of the emulsion fed from the mixer 30 is 90% by volume based on the volume of the storage tank 40, the amount of the emulsion actually stored in the storage tank 40 is less than 90% by volume (e.g., about 80% by volume or less) based on the volume of the storage tank 40, and accordingly the liquid surface of the emulsion in the storage tank 40 can be relatively lowered. Enabling the liquid surface of the emulsion to be relatively lowered makes it possible to effectively increase, even when the temperature at which the organic solvent is removed under reduced pressure in the second removal step is relatively high, the efficiency of removing the organic solvent while effectively preventing the problem in that some of the emulsion enters the concentrator 60 from the storage tank 40 due to the foaming of the emulsion and the yield is impaired.

When performing the second removal step, the removal of the organic solvent through the second removal step may be performed on the emulsion that has undergone the first removal step after adding an antifoaming agent, and according to the production method of the present invention, the organic solvent can be removed under reduced pressure while the liquid surface of the emulsion is relatively lowered in the storage tank 40, and thus the amount of such an antifoaming agent added can be relatively small. In particular, when the amount of the added antifoaming agent is excessive, small defects called fish eyes may occur on the surface of the obtained molded film such as a dip-molded article, but according to the production method of the present invention, production of such fish eyes can be effectively prevented. The time of adding an antifoaming agent when using an antifoaming agent is not particularly limited. The antifoaming agent may be added in advance to the emulsion before removing the organic solvent under reduced pressure in the second removal step, or may be suitably added to the emulsion while removing the organic solvent under reduced pressure in the second removal step.

In the second removal step of the production method of the present invention, the time of reduced-pressure removal when removing the organic solvent contained in the emulsion under reduced pressure in the storage tank 40 is preferably 1 to 20 hours, and more preferably 2 to 15 hours. In the production method of the present invention, some of the organic solvent contained in the emulsion obtained in the emulsification step is already removed immediately after emulsification in the first removal step, and thus the removal of the organic solvent under reduced pressure in the second removal step is performed while some of the organic solvent is already removed, thereby making it possible to suitably remove the organic solvent even when the time of reduced-pressure removal is relatively short and, moreover, suppress production of aggregates in the obtained latex of synthetic rubber.

Removal of the organic solvent from the emulsion under reduced pressure in the second removal step may be initiated promptly after terminating the operation of continuously obtaining the emulsion in the emulsification step (i.e., the operation of continuously feeding the solution or dispersion of synthetic rubber and the aqueous solution of an emulsifier to the mixer to continuously obtain an emulsion and continuously transferring the emulsion to the storage tank 40), and more specifically, may be initiated after terminating the operation of continuously obtaining the emulsion and after performing various operations necessary for removing the organic solvent from the emulsion under reduced pressure in the second removal step. Removal of the organic solvent from the emulsion under reduced pressure may be embodied by initiating it after terminating the operation of continuously obtaining the emulsion and after continuing removal of the organic solvent from the emulsion at a pressure of 700 to 760 mmHg in the first removal step for a predetermined period of time.

Thus, a latex of synthetic rubber can be obtained according to the production method of the present invention. The latex of synthetic rubber thus obtained may be blended with additives that are usually blended in the field of latex, such as a pH adjuster, an antifoaming agent, a preservative, a chelating agent, an oxygen scavenger, a dispersing agent, and an antiaging agent.

Examples of the pH adjuster include alkali metal hydroxides such as sodium hydroxide and potassium hydroxide; alkali metal carbonates such as sodium carbonate and potassium carbonate; alkali metal hydrogencarbonates such as sodium hydrogencarbonate; ammonia; organic amine compounds such as trimethylamine and triethanolamine; and the like. Alkali metal hydroxides and ammonia are preferable.

In order to increase the solids concentration of the latex of synthetic rubber, a concentrating operation by centrifugation may be performed as necessary.

The volume average particle diameter of the latex of synthetic rubber produced by the production method of the present invention is preferably 0.1 to 10 µm, more preferably 0.5 to 3 µm, and even more preferably 1 to 2 µm. Configuring the volume average particle diameter to be in the above range provides a suitable latex viscosity and makes it easy to handle the latex and, also, makes it possible to suppress formation of a membrane on the latex surface when the latex of synthetic rubber is stored.

The solids concentration of the latex of synthetic rubber produced by the production method of the present invention is preferably 30 to 70% by weight and more preferably 40 to 70% by weight. Configuring the solids concentration to be in the above range makes it possible to suppress separation of polymer particles when the latex of synthetic rubber is stored, and also makes it possible to suppress production of coarse aggregates resulting from mutual aggregation of polymer particles.

Latex Composition

The latex of synthetic rubber produced by the production method of the present invention may be formed into a latex composition by adding a crosslinking agent.

Examples of the crosslinking agent include sulfur such as powdered sulfur, sublimed sulfur, precipitated sulfur, colloidal sulfur, surface-treated sulfur, and insoluble sulfur; and sulfur-containing compounds such as sulfur chloride, sulfur dichloride, morpholine disulfide, alkylphenol disulfide, caprolactam disulfide, phosphorus-containing polysulfide, polymer polysulfide, and 2-(4'-morpholinodithio)benzothiazole. Among these, sulfur can be preferably used. One crosslinking agent can be used singly, and two or more can be used in combination.

The content of the crosslinking agent is not particularly limited, and is preferably 0.1 to 10 parts by weight and more preferably 0.2 to 3 parts by weight based on 100 parts by weight of synthetic rubber contained in the latex of synthetic rubber. Configuring the content of the crosslinking agent to be in the above range can further increase the tensile strength of the obtained molded film such as a dip-molded article.

Preferably, the latex composition further contains a crosslinking accelerator.

A crosslinking accelerator that is usually used in dip molding can be used, and examples include dithiocarbamic acids such as diethyldithiocarbamic acid, dibutyldithiocarbamic acid, di-2-ethylhexyl dithiocarbamic acid, dicyclohexyl dithiocarbamic acid, diphenyl dithiocarbamic acid and dibenzyl dithiocarbamic acid, and zinc salts thereof; 2-mercaptobenzothiazole, zinc 2-mercaptobenzothiazole, 2-mercaptothiazoline, dibenzothiazyl disulfide, 2-(2,4-dinitrophenylthio)benzothiazole, 2-(N,N-diethylthio carbylthio) benzothiazole, 2-(2,6-dimethyl-4-morpholinothio) benzothiazole, 2-(4'-morpholino dithio)benzothiazole, 4-morpholinyl-2-benzothiazyl disulfide, and 1,3-bis(2-benzothiazyl mercaptomethyl)urea; and the like. Zinc diethyldithiocarbamate, zinc 2-dibutyldithiocarbamate, and zinc 2-mercaptobenzothiazole are preferable. One crosslinking accelerator can be used singly, or two or more can be used in combination.

The content of the crosslinking accelerator is preferably 0.05 to 5 parts by weight and more preferably 0.1 to 2 parts by weight based on 100 parts by weight of synthetic rubber contained in the latex of synthetic rubber. Configuring the content of the crosslinking accelerator to be in the above range can further increase the tensile strength of the obtained molded film such as a dip-molded article.

Preferably, the latex composition further contains zinc oxide.

The content of zinc oxide is not particularly limited, and is preferably 0.1 to 5 parts by weight and more preferably 0.2 to 2 parts by weight based on 100 parts by weight of synthetic rubber contained in the latex of synthetic rubber. Configuring the content of zinc oxide to be in the above range further increases the tensile strength of the obtained molded film such as a dip-molded articled while imparting good emulsion stability.

The latex composition can be further blended with additives as necessary, such as an antiaging agent; a dispersing agent; a reinforcing agent such as carbon black, silica, or talc; a filler such as calcium carbonate or clay; a UV absorber; and a plasticizer.

Examples of the antiaging agent include sulfur-free phenolic antiaging agents such as 2,6-di-4-methylphenol, 2,6-di-t-butylphenol, butylhydroxyanisole, 2,6-di-t-butyl-α-di-methylamino-p-cresol, octadecyl-3-(3,5-di-t-butyl-4-hydroxyphenyl) propionate, styrenated phenol, 2,2'-methylene-bis(6-α-methyl-benzyl-p-cresol), 4,4'-methylenebis(2,6-di-t-butylphenol), 2,2'-methylene-bis(4-methyl-6-t-butylphenol), alkylated bisphenol, and a butylated reaction product of p-cresol and dicyclopentadiene; thiobisphenol antiaging agents such as 2,2'-thiobis-(4-methyl-6-t-butylphenol), 4,4'-thiobis-(6-t-butyl-o-cresol), and 2,6-di-t-butyl-4-(4,6-bis(octylthio)-1,3,5-triazin-2-ylamino)phenol; phosphite antiaging agents such as tris(nonylphenyl) phosphite, diphenyl isodecyl phosphite, tetraphenyl dipropyleneglycol diphosphite; sulfur ester antiaging agents such as dilauryl thiodipropionate; amine antiaging agents such as phenyl-α-naphthylamine, phenyl-β-naphthylamine, p-(p-toluenesulfonylamide)-diphenylamine, 4,4'-(α,α-dimethylbenzyl)diphenylamine, N,N-diphenyl-p-phenylenediamine, N-isopropyl-N'-phenyl-p-phenylenediamine, and a butyraldehyde-aniline condensate; quinoline antiaging agents such as 6-ethoxy-2,2,4-trimethyl-1,2-dihydroquinoline; hydroquinone antiaging agents such as 2,5-di-(t-amyl)hydroquinone; and the like. One of these antiaging agents can be used singly, or two or more can be used in combination.

The content of the antiaging agent is preferably 0.05 to 10 parts by weight and more preferably 0.1 to 5 parts by weight based on 100 parts by weight of synthetic rubber contained in the latex of synthetic rubber.

The method for preparing the latex composition is not particularly limited, and examples include a method involving blending the latex of synthetic rubber with a crosslinking agent and various optional additives using a disperser such as a ball mill, a kneader, or a disper, a method involving preparing an aqueous dispersion of blending components other than the latex of synthetic rubber using the disperser and then mixing the aqueous dispersion with the latex of synthetic rubber, and the like.

The latex composition preferably has a pH of 7 or more, more preferably a pH in the range of 7 to 13, and even more preferably a pH in the range of 8 to 12. Also, the latex composition preferably has a solids concentration in the range of 15 to 65% by weight.

From the viewpoint of further enhancing the mechanical properties of the obtained molded film such as a dip-molded article, the latex composition is preferably aged (pre-crosslinked) before being subjected to molding such as dip molding. The time of pre-crosslinking is not particularly limited and is preferably 1 to 14 days and more preferably 1 to 7 days depending on the temperature of pre-crosslinking. The temperature of pre-crosslinking is preferably 20 to 40° C.

Then, after being pre-crosslinked, the latex composition is preferably stored at a temperature of 10 to 30° C. until being subjected to molding such as dip molding. If the latex composition remaining at a high temperature is stored, the tensile strength of the obtained molded film such as a dip-molded article may be impaired.

Molded Film

A molded film can be obtained by shaping the latex composition into a film. The film thickness of the molded film is preferably 0.03 to 0.50 mm, more preferably 0.05 to 0.40 mm, and particularly preferably 0.08 to 0.30 mm.

The molded film is not particularly limited, and is preferably a dip-molded article obtained by dip-molding the latex composition. Dip molding is a method involving dipping a mold in the latex composition to cause the composition to adhere to the surface of the mold, then raising the mold from the composition, and, thereafter, drying the composition that has adhered to the surface of the mold. The mold before being dipped in the latex composition may be preheated. A coagulant can be used as necessary before dipping the mold in the latex composition or after raising the mold from the latex composition.

Specific examples of the method for using a coagulant include a method involving dipping the mold, which is before being dipped in the latex composition, in a solution of a coagulant to cause the coagulant to adhere to the mold (an anode coagulant dipping method), a method involving dipping a mold, to which the latex composition has adhered, in a coagulant solution (a teague coagulant dipping method), and the like. From the viewpoint of obtaining a dip-molded article that unlikely has thickness non-uniformity, an anode coagulant dipping method is preferable.

Specific examples of the coagulant include water-soluble polyvalent metal salts, e.g., metal halides such as barium chloride, calcium chloride, magnesium chloride, zinc chloride, and aluminum chloride; nitrates such as barium nitrate, calcium nitrate, and zinc nitrate; acetates such as barium acetate, calcium acetate, and zinc acetate; sulfates such as calcium sulfate, magnesium sulfate, and aluminum sulfate; and the like. In particular, calcium salts are preferable, and calcium nitrate is more preferable. One of these water-soluble polyvalent metal salts can be used singly, or two or more can be used in combination.

The coagulant is preferably used in the form of an aqueous solution. The aqueous solution may further contain a water-soluble organic solvent such as methanol or ethanol, and a nonionic surfactant. The concentration of the coagulant varies according to the types of the water-soluble polyvalent metal salt, and is preferably 5 to 50% by weight and more preferably 10 to 30% by weight.

The mold after being raised from the latex composition is usually heated to dry the adhered material formed on the mold. The drying conditions may be suitably selected.

Then, the adhered material formed on the mold is heated and crosslinked.

The heating conditions during crosslinking are not particularly limited, and the heating temperature is preferably 60 to 150° C. and more preferably 100 to 130° C., and the heating time is preferably 10 to 120 minutes. The heating method is not particularly limited, and examples include a method involving heating by hot air in an oven, a method involving heating by infrared irradiation, and the like.

Before or after heating the mold to which the latex composition has adhered, the mold is preferably washed with water or hot water to remove water-soluble impurities (such as an excessive surfactant and coagulant). The hot water used is preferably 40 to 80° C. and more preferably 50 to 70° C.

The dip-molded article after being crosslinked is removed from the mold. Specific examples of the removal method include a method involving separating the article from the mold by hand, a method involving separating the article by water pressure or compressed air pressure, and the like. If the dip-molded article during the course of being crosslinked has sufficient strength against removal, the article may be removed during the course of being crosslinked, and subsequently the rest of the crosslinking may be continued.

The molded film, and the dip-molded article that is one embodiment thereof, can be particularly suitably used as, for example, a glove. In the case where the molded film is a glove, in order to prevent the contact surfaces of molded films from tightly adhering to each other and to allow the articles to be smoothly worn and pulled off, fine inorganic particles of talc, calcium carbonate or the like or fine organic particles such as starch particles may be spread onto the glove surface, an elastomer layer containing fine particles may be formed on the glove surface, or the surface layer of the glove may be chlorinated.

In addition to gloves, the molded film and the dip-molded article that is one embodiment thereof can be used in medical products such as bottle teats, droppers, tubes, water pillows, balloon sacks, catheters, and condoms; toys such as air balls, dolls, and balls; industrial products such as pressure molding bags and gas storage bags; fingerstalls; and the like.

Adhesive Layer-Formed Substrate

The adhesive layer-formed substrate is a composite of a substrate and an adhesive layer, which includes an adhesive layer formed of the latex of synthetic rubber produced by the production method of the present invention.

The substrate is not particularly limit, and, for example, a fiber substrate can be used. The kind of fiber that constitutes the fiber substrate is not particularly limited, and examples include vinylon fiber, polyester fiber, polyamide fiber such as nylon and aramid (aromatic polyamide), glass fiber, cotton, rayon, and the like. These can be suitably selected according to the application thereof. The form of the fiber substrate is not particularly limited, and examples include staple, filament, cord, rope, and woven fabric (such as canvas), and can be suitably selected according to the application thereof.

The adhesive layer may be formed of the latex of synthetic rubber produced by the production method of the present invention. The latex of synthetic rubber may be used as-is without being blended with an additive or the like or, alternatively, may be blended with various additives to form an adhesive composition, and such an adhesive composition may be used to form an adhesive layer.

An example of the additive contained in the adhesive composition may be an adhesive resin. The adhesive resin is not particularly limited, and, for example, a resorcin-formaldehyde resin, a melamine resin, an epoxy resin, and an isocyanate resin can be suitably used. Among these, a resorcin-formaldehyde resin is preferable. A known resorcin-formaldehyde resin can be used (such as those disclosed in Japanese Patent Laid-Open No. 55-142635). The proportions of reacted resorcin and formaldehyde in terms of the molar ratio of "resorcin:formaldehyde" are usually 1:1 to 1:5 and preferably 1:1 to 1:3.

To further increase adhesion, the adhesive composition can contain commonly used 2,6-bis(2,4-dihydroxyphenylmethyl)-4-chlorophenol or a similar compound, isocyanate, block isocyanate, ethylene urea, polyepoxide, a modified polyvinyl chloride resin, or the like.

Moreover, the adhesive composition can contain a vulcanization aid. The vulcanization aid can increase the mechanical strength of the adhesive layer-formed substrate. Examples of the vulcanization aid include quinone dioximes such as p-quinone dioxime; methacrylic acid esters such as lauryl methacrylate and methyl methacrylate; allyl compounds such as DAF (diallyl fumarate), DAP (diallyl phthalate), TAC (triallyl cyanurate), and TAIC (triallyl isocyanurate); maleimide compounds such as bismaleimide, phenylmaleimide, N,N-m-phenylenedimaleimide; sulfur; and the like.

The content (solids content) of synthetic rubber in the adhesive composition is preferably 5 to 60% by weight and more preferably 10 to 30% by weight.

The adhesive layer-formed substrate can be obtained by forming an adhesive layer on a substrate by, for example, a method involving applying the latex of synthetic rubber produced by the production method of the present invention or an adhesive composition containing it to the substrate surface or a method involving dipping a substrate in the latex of synthetic rubber or an adhesive composition containing it.

Such an adhesive layer-formed substrate of the present invention can be used as a substrate-rubber composite by, for example, adhering it to rubber via the adhesive layer. Examples of the substrate-rubber composite include, but are not particularly limited to, a toothed rubber belt provided with core wire wherein a cord-like fiber substrate is used, a toothed rubber belt wherein a base fabric-like fiber substrate such as canvas is used, and the like.

The method for obtaining the substrate-rubber composite is not particularly limited, and an example may be a method involving adhering the latex of a synthetic rubber produced by the production method of the present invention or an adhesive composition containing it to a substrate by a coating method, a dipping treatment, or the like to obtain an adhesive layer-formed substrate, then placing the adhesive layer-formed substrate on rubber, and heating and pressurizing it. Pressurization can be performed using a press molding machine, a metal roll, an injection molding machine, or the like. The pressure during pressurization is preferably 0.5 to 20 MPa and more preferably 2 to 10 MPa. The heating temperature is preferably 130 to 300° C. and more preferably 150 to 250° C. The treatment time of heating and pressurization is preferably 1 to 180 minutes and more preferably 5 to 120 minutes. The method involving heating and pressurizing makes it possible to simultaneously shape rubber and adhere the adhesive layer-formed substrate and rubber. The inner surface of the mold of a compressor and the surface of a roll used in pressurization preferably has a pattern for imparting a desired surface shape to the rubber of the target substrate-rubber composite.

One embodiment of the substrate-rubber composite may be a substrate-rubber-substrate composite. The substrate-rubber-substrate composite can be formed by, for example, combining a substrate (which may be a composite of two or more substrates) and a substrate-rubber composite. Specifically, core wire as a substrate, rubber, and base fabric as a substrate are placed one on top of the other (at this time, the core wire and the base fabric are already formed into adhesive layer-formed substrates by suitably adhering the latex of synthetic rubber or an adhesive composition containing it) and pressurized while being heated, and thereby a substrate-rubber-substrate composite can be obtained.

The substrate-rubber composite obtained using such an adhesive layer-formed substrate is suitably usable in belts such as flat belts, V-belts, V-ribbed belts, round belts, square belts, toothed belts, and belts-in-oil; and hoses, tubes, and diaphragms. Examples of hoses include single-tube rubber hoses, multilayer rubber hoses, braided reinforced hoses, cloth-wrapped reinforced hoses, and the like. Examples of diaphragms include flat diaphragms, rolling diaphragms, and the like.

EXAMPLES

Below, the present invention will now be described by way of more detailed Examples, but the present invention is not limited to the Examples. The "part" below is based on weight unless specified otherwise. Tests and evaluations were performed as follows.

Aggregate Content in Synthetic Polyisoprene Latex

On an aluminum plate (weight: X1), 2 g of synthetic polyisoprene latex (weight: X2) was precisely weighed, and dried in a hot air drier at 105° C. for 2 hours. Then, after the synthetic polyisoprene latex was cooled in a desiccator, the weight including that of the aluminum plate was measured (weight: X3), and the solids concentration of the synthetic polyisoprene latex was calculated according to the following formula:

$$\text{Solids Concentration (\% by Weight)}=(X3-X1)\times100/X2$$

Then, about 100 g of the synthetic polyisoprene latex was precisely weighed and filtered through a 200-mesh SUS wire mesh having a known weight, and aggregates on the wire mesh were washed with water several times to remove the synthetic polyisoprene latex. This was dried at 105° C. for 60 minutes, and then its dry weight was measured to determine the aggregate content (unit: % by weight) in the synthetic polyisoprene latex according to the following formula:

$$\text{Aggregate content (\% by weight)}=\{(\alpha-\beta)/(\gamma\times\Delta)\}\times10000$$

wherein α represents the weight of the wire mesh after drying and the dry aggregates, β represents the weight of the wire mesh, γ represents the weight of the synthetic polyisoprene latex, and Δ represents the solids concentration of the synthetic polyisoprene latex.

Example 1

(Preparation of Cyclohexane Solution of Synthetic Polyisoprene (a))

Synthetic polyisoprene (trade name "NIPOL IR2200L" manufactured by Zeon Corporation) was mixed with cyclohexane (boiling point: 81° C.) and dissolved by increasing the temperature to 60° C. while being stirred to prepare a cyclohexane solution of synthetic polyisoprene (a) having a synthetic polyisoprene concentration of 8% by weight.

(Preparation of Aqueous Potassium Resinate Solution (b))

Potassium rosinate as an emulsifier was mixed with water at a temperature of 60° C. to thus prepare an aqueous potassium rosinate solution (b) having a potassium rosinate concentration of 1% by weight.

(Production of Synthetic Polyisoprene Latex)

Synthetic polyisoprene latex was produced with the emulsifying apparatus shown in FIG. 1 using the cyclohexane solution of synthetic polyisoprene (a) and the aqueous potassium rosinate solution (b) prepared above.

Specifically, the cyclohexane solution of synthetic polyisoprene (a) prepared above was stored in the polymer tank 10 while being heated to 60° C., the aqueous potassium rosinate solution (b) prepared above was stored in the emulsifier tank 20 while being heated to 60° C., these were continuously fed to the mixer 30 such that the weight ratio of "synthetic polyisoprene":"potassium rosinate" was 10:1 to continuously obtain an emulsion, and the obtained emulsion was continuously discharged to the storage tank 40 maintained at a pressure of 760 mmHg.

The rate of discharging the emulsion to the storage tank 40 was 0.1 $Xm^3$/hr ($Xm^3$ denotes the volume of the storage tank 40). That is, in this Example, the rate of transferring the emulsion to the storage tank 40 was 0.1 (1/hr). In this Example, the valve 50 was set to "open" to configure the storage tank 40 to be an open system. The inner pressure thereof was maintained at 760 mmHg, and the temperature of the emulsion was maintained at 60° C. Thus, while the emulsion was transferred to the storage tank 40, cyclohexane was simultaneously removed by evaporation in the storage tank 40 (normal-pressure removal).

Then, in this Example, such transfer of the emulsion to the storage tank 40 and removal of cyclohexane by evaporation in the storage tank 40 (normal-pressure removal) were continuously performed until the amount of the emulsion discharged to the storage tank 40 was 92% by volume based on the volume of the storage tank 40, and then transfer of the emulsion to the storage tank 40 was terminated. The amount of the emulsion in the storage tank 40 immediately after transfer of the emulsion to the storage tank 40 was terminated was 57% by volume based on the volume of the storage tank 40 (i.e., it can be said that 35% by volume of cyclohexane was removed by evaporation of cyclohexane (normal-pressure removal)).

Then, after transfer of the emulsion to the storage tank 40 was terminated, a pressure reducing pump was connected to the downstream side of the concentrator 60. By initiating the operation of reducing the pressure inside the storage tank 40, with the emulsion in the storage tank 40 being heated to 85° C., cyclohexane was removed under reduced pressure by maintaining the emulsion in the storage tank 40 at 85° C. while maintaining the pressure inside the storage tank 40 at 50 mmHg. During the removal of cyclohexane under reduced pressure, the amount of cyclohexane recovered by the concentrator 60 was measured hourly, which was performed until it can be judged that the cyclohexane content in the emulsion was 100 wt ppm or less based on synthetic rubber in the emulsion, and the time required therefor was regarded as the time of reduced-pressure removal (the same applies to Examples 1 to 4 and Comparative Example 1 described below). In this Example, the time of reduced-pressure removal was 9 hours. The reduced-pressure removal of cyclohexane was performed while suitably adding a defoaming agent.

The aggregate content of the synthetic polyisoprene latex obtained by the above operations was measured according to the above method. The results are shown in Table 1.

Example 2

Synthetic polyisoprene latex was produced by performing the same operation as in Example 1 except that the rate of discharging the emulsion from the mixer 30 to the storage tank 40 was twice the rate in Example 1 (that is, in this Example, the rate of transferring the emulsion to the storage tank 40 was 0.2 (1/hr)). In Example 2, the amount of the emulsion in the storage tank 40 immediately after transfer of the emulsion to the storage tank 40 was terminated was 74% by volume based on the volume of the storage tank 40, and the time of reduced-pressure removal (i.e., the time required for the cyclohexane content in the emulsion to be 100 wt ppm or less based on synthetic rubber in the emulsion) was 10 hours. The aggregate content of the obtained synthetic polyisoprene latex was measured according to the above method. The results are shown in Table 1.

Example 3

Synthetic polyisoprene latex was produced by performing the same operation as in Example 1 except that the temperature when storing the cyclohexane solution (a) of synthetic polyisoprene in the polymer tank 10 was 80° C., the temperature when storing the aqueous potassium rosin solution (b) in the emulsifier tank 20 was 80° C., and the temperature of the emulsion was maintained at 80° C. when removing cyclohexane by evaporation in the storage tank 40 (normal-pressure removal) simultaneously with transferring the emulsion to the storage tank 40. In Example 3, the amount of the emulsion in the storage tank 40 immediately after transfer of the emulsion to the storage tank 40 was terminated was 55% by volume based on the volume of the storage tank 40, and the time of reduced-pressure removal (i.e., the time required for the cyclohexane content in the emulsion to be 100 wt ppm or less based on synthetic rubber in the emulsion) was 7 hours. The aggregate content of the obtained synthetic polyisoprene latex was measured according to the above method. The results are shown in Table 1.

Example 4

Synthetic polyisoprene latex was produced by performing the same operation as in Example 3 except that the temperature of maintaining the emulsion in the storage tank 40 when removing cyclohexane under reduced pressure from the emulsion in the storage tank 40 was changed to 70° C. In Example 4, the amount of the emulsion in the storage tank 40 immediately after transfer of the emulsion to the storage tank 40 was terminated was 55% by volume based on the volume of the storage tank 40, and the time of reduced-pressure removal (i.e., the time required for the cyclohexane content in the emulsion to be 100 wt ppm or less based on synthetic rubber in the emulsion) was 14 hours. The aggregate content of the obtained synthetic polyisoprene latex was measured according to the above method. The results are shown in Table 1.

Comparative Example 1

Synthetic polyisoprene latex was produced by performing the same operation as in Example 1 except that when the emulsion was continuously obtained in the mixer 30 and the obtained emulsion was continuously discharged to the storage tank 40 maintained at a pressure of 760 mmHg, the pressure in the storage tank 40 was maintained at 760 mmHg and the temperature of the emulsion was maintained at 60° C., but the valve 50 connected to the storage tank 40 was "closed" to cause the storage tank 40 to be a closed system, and thus removal of cyclohexane by evaporation (normal-pressure removal) was not performed when continuously transferring the emulsion into the storage tank 40. In Comparative Example 1, since removal of cyclohexane by evaporation (normal-pressure evaporation) was not performed, the amount of the emulsion in the storage tank 40 immediately after terminating the transfer of the emulsion to the storage tank 40 was 92% by volume based on the volume of the storage tank 40 (i.e., the same as the amount discharged from the mixer 30), and the time of reduced-pressure removal (i.e., the time required for the cyclohexane content in the emulsion to be 100 wt ppm or less based on synthetic rubber in the emulsion) was 24 hours or longer. Moreover, in Comparative Example 1, severe foaming occurred during reduced-pressure removal of cyclohexane, and it was therefore necessary to add a large amount of an antifoaming agent (specifically, an amount of 2000 or more based on the foaming agent used in Example 1 being 100). The aggregate content of the obtained synthetic polyisoprene latex was measured according to the above method. The results are shown in Table 1.

Comparative Example 2

The operation was performed in the same manner as in Example 1 except that when the emulsion was continuously obtained in the mixer 30 and the obtained emulsion was continuously discharged to the storage tank 40, a pressure reducing pump was connected to the downstream side of the concentrator 60, and a pressure reducing operation was performed to maintain the pressure of the storage tank 40 at 500 mmHg. Due to the effect of regulating the pressure of the storage tank 40 to 500 mmHg, the foaming of the emulsion was significant, the foaming caused the emulsion to enter the concentrator 60, it was not possible to continue operating the concentrator 60, and thus the operation was terminated.

TABLE 1

| | Emulsification step | | First removal step | | | | | | Second removal step | | | | |
| --- | --- | --- | --- | --- | --- | --- | --- | --- | --- | --- | --- | --- | --- |
| | Temperature of cyclohexane solution of synthetic polyisoprene (° C.) | Temperature of aqueous potassium rosinate solution (° C.) | Temperature of emulsion (° C.) | Pressure of tank 40 (mmHg) | Transfer rate (1/hr) | Amount of emulsion after first removal step (% by volume) | Whether normal-pressure removal conducted or not | Valve 50 | Temperature of emulsion (° C.) | Time of reduced-pressure removal (hr) | Pressure of tank 40 (mmHg) | Amount of anti-foaming agent used *1) | Aggregate content (% by weight) |
| Example 1 | 60 | 60 | 60 | 760 | 0.1 | 57 | Conducted | Open | 85 | 9 | 50 | 100 | 3 or less |
| Example 2 | 60 | 60 | 60 | 760 | 0.2 | 61 | Conducted | Open | 85 | 10 | 50 | 100 | 5 |
| Example 3 | 80 | 80 | 80 | 760 | 0.1 | 55 | Conducted | Open | 85 | 7 | 50 | 100 | 9 |
| Example 4 | 80 | 80 | 80 | 760 | 0.1 | 55 | Conducted | Open | 70 | 14 | 50 | 100 | 8 |

TABLE 1-continued

| | Emulsification step | | First removal step | | | | | | Second removal step | | | | |
|---|---|---|---|---|---|---|---|---|---|---|---|---|---|
| | Temperature of cyclohexane solution of synthetic polyisoprene (° C.) | Temperature of aqueous potassium rosinate solution (° C.) | Temperature of emulsion (° C.) | Pressure of tank 40 (mmHg) | Transfer rate (1/hr) | Amount of emulsion after first removal step (% by volume) | Whether normal-pressure removal conducted or not | Valve 50 | Temperature of emulsion (° C.) | Time of reduced-pressure removal (hr) | Pressure of tank 40 (mmHg) | Amount of antifoaming agent used *1) | Aggregate content (% by weight) |
| Comparative Example 1 | 60 | 60 | 60 | 760 | 0.1 | 92 | Not conducted | Closed | 85 | 24 or more | 50 | 2000 or more | 10 or more |
| Comparative Example 2 | 60 | 60 | 60 | 500 | 0.1 | — | Conducted | Open | — | — | — | — | — |

*1) In Table 1, the amount of the antifoaming agent used was expressed by a value relative to the amount of the antifoaming agent used in Example 1 being 100.

As shown in Table 1, in the case where the organic solvent was removed under normal pressure in the tank 40 while continuously transferring the emulsion, which was continuously obtained in the mixer 30, to the tank 40 regulated to a pressure condition of 700 to 760 mmHg (in the first removal step), and then the organic solvent was removed from the emulsion, which had undergone such normal-pressure removal, under a reduced pressure of less than 700 mmHg (the second removal step), it was possible to shorten the time of reduced-pressure removal, accordingly it was possible to increase productivity, and, moreover, it was possible to reduce the amount of aggregates in the obtained latex of synthetic rubber (Examples 1 to 4).

On the other hand, the case where no normal-pressure removal (the first removal step) of the organic solvent was performed resulted in that the removal of the organic solvent under reduced pressure (the second removal step) required a long period of time, thus productivity was poor, also it was necessary to add a large amount of an antifoaming agent when performing the reduced-pressure removal, and, moreover, the amount of aggregates in the obtained latex of synthetic rubber was large (Comparative Example 1).

Furthermore, the case where the organic solvent was removed in the tank 40 under a reduced-pressure condition of 500 mmHg while continuously transferring the emulsion, which was continuously obtained in the mixer 30, to the tank 40 resulted in that the foaming of the emulsion was significant, the foaming caused the emulsion to enter the concentrator 60, and it was not possible to continue operating the concentrator 60 (Comparative Example 2).

The invention claimed is:

1. A method for producing a latex of a synthetic rubber, the method comprising:
   an emulsification step of continuously feeding a solution or a dispersion of a synthetic rubber obtained by dissolving or dispersing the synthetic rubber in an organic solvent and an aqueous solution of an emulsifier to a mixer and mixing to continuously obtain an emulsion;
   a first removal step of removing the organic solvent from the emulsion continuously obtained in the emulsification step in a container while the emulsion is continuously transferred to the container regulated to a pressure condition of 700 to 760 mmHg; and
   a second removal step of removing the organic solvent from the emulsion that has undergone the first removal step under a pressure of less than 700 mmHg,
   wherein in the first removal step, the organic solvent is removed while controlling a temperature of the emulsion to a temperature lower than a boiling point of the organic solvent, and
   in the first removal step, a rate of transferring the emulsion to the container (1/hr) as determined by dividing a rate of feeding the emulsion to the container ($m^3$/hr) by a volume of the container ($m^3$) is 0.1 to 0.5.

2. The method for producing a latex of a synthetic rubber according to claim 1, wherein in the first removal step, the organic solvent is removed while controlling a temperature of the emulsion to a temperature at least 10° C. lower than a boiling point of the organic solvent contained in the emulsion.

3. The method for producing a latex of a synthetic rubber according to claim 1, wherein in the second removal step, the organic solvent is removed while controlling a temperature of the emulsion to a temperature higher than or equal to a boiling point of the organic solvent.

4. The method for producing a latex of a synthetic rubber according to claim 1, wherein in the second removal step, the organic solvent is removed under a pressure of 1 to 600 mmHg.

5. The method for producing a latex of a synthetic rubber according to claim 1, wherein the removal of the organic solvent under a pressure of 700 to 760 mmHg by the first removal step is continued until an amount of the emulsion fed to the container is 70 to 140% by volume based on a volume of the container, and then a pressure inside the container is set to less than 700 mmHg to perform the removal of the organic solvent by the second removal step.

6. The method for producing a latex of a synthetic rubber according to claim 2, wherein the temperature is at least 20° C. lower than a boiling point of the organic solvent contained in the emulsion.

7. The method for producing a latex of a synthetic rubber according to claim 1, wherein the rate of transferring is 0.1 to 0.3.

8. The method for producing a latex of a synthetic rubber according to claim 1, wherein the rate of transferring is 0.1 to 0.15.

9. The method for producing a latex of a synthetic rubber according to claim 5, wherein amount of the emulsion fed to the container is 80 to 130% by volume based on a volume of the container.

10. The method for producing a latex of a synthetic rubber according to claim 5, wherein amount of the emulsion fed to the container is 90 to 120% by volume based on a volume of the container.

11. The method for producing a latex of a synthetic rubber according to claim 4, wherein the pressure is 10 to 500 mmHg.

12. The method for producing a latex of a synthetic rubber according to claim 4, wherein the pressure is 100 to 400 mmHg.

13. The method for producing a latex of a synthetic rubber according to claim 1, wherein in the second removal step, the organic solvent is removed while controlling a temperature of the emulsion to a temperature higher than a boiling point of the organic solvent contained in the emulsion.

14. The method for producing a latex of a synthetic rubber according to claim 13, wherein the temperature is at least 5° C. higher than a boiling point of the organic solvent contained in the emulsion.

15. The method for producing a latex of a synthetic rubber according to claim 13, wherein the temperature is at least 10° C. higher than a boiling point of the organic solvent contained in the emulsion.

* * * * *